(12) United States Patent
Morarity et al.

(10) Patent No.: US 11,579,256 B2
(45) Date of Patent: Feb. 14, 2023

(54) VARIABLE PHASE SCANNING LIDAR SYSTEM

(71) Applicant: Microvision, Inc., Redmond, WA (US)

(72) Inventors: Jonathan A. Morarity, Seattle, WA (US); Alga Lloyd Nothern, III, Seattle, WA (US); Thomas Nonn, Kenmore, WA (US); Sumit Sharma, Seattle, WA (US)

(73) Assignee: Microvision, Inc., Redmond, WA (US)

( * ) Notice: Subject to any disclaimer, the term of this patent is extended or adjusted under 35 U.S.C. 154(b) by 882 days.

(21) Appl. No.: 16/508,821

(22) Filed: Jul. 11, 2019

(65) Prior Publication Data

US 2021/0011133 A1    Jan. 14, 2021

(51) Int. Cl.
*G01S 7/481*    (2006.01)
*G01S 7/4863*    (2020.01)
*G01S 7/484*    (2006.01)
*G01S 7/48*    (2006.01)

(52) U.S. Cl.
CPC .......... *G01S 7/4817* (2013.01); *G01S 7/4804* (2013.01); *G01S 7/484* (2013.01); *G01S 7/4863* (2013.01)

(58) Field of Classification Search
CPC ...... G01S 7/4817; G01S 7/4804; G01S 7/484; G01S 7/4863; G01S 17/42; G01S 17/931
See application file for complete search history.

(56) References Cited

U.S. PATENT DOCUMENTS

| | | | |
|---|---|---|---|
| 7,609,875 B2 | 10/2009 | Liu et al. | |
| 8,446,571 B2 | 5/2013 | Fiess et al. | |
| 9,098,931 B2 | 8/2015 | Shpunt et al. | |
| 9,267,787 B2 | 2/2016 | Shpunt | |
| 9,651,417 B2 | 5/2017 | Shpunt et al. | |
| 9,677,878 B2 | 6/2017 | Shpunt et al. | |
| 9,753,351 B2 | 9/2017 | Eldada | |
| 9,766,060 B1 * | 9/2017 | Honkanen | G01S 17/89 |
| 9,784,838 B1 * | 10/2017 | Shpunt | G01S 17/42 |
| 9,804,264 B2 | 10/2017 | Villenueve et al. | |
| 9,823,353 B2 | 11/2017 | Eichenholz et al. | |
| 9,841,495 B2 | 12/2017 | Campbell et al. | |
| 9,857,468 B1 | 1/2018 | Eichenholz et al. | |
| 9,869,754 B1 | 1/2018 | Campbell et al. | |
| 9,874,635 B1 | 1/2018 | Eichenholz et al. | |
| 9,897,687 B1 | 2/2018 | Campbell et al. | |
| 9,898,074 B2 | 2/2018 | Shpunt et al. | |
| 9,958,545 B2 | 5/2018 | Eichenholz et al. | |
| 2013/0282357 A1 * | 10/2013 | Rubin | G01C 21/26 703/22 |
| 2016/0047899 A1 * | 2/2016 | Dussan | G01S 7/4817 356/4.01 |
| 2016/0195386 A1 | 7/2016 | Yoon et al. | |
| 2016/0334509 A1 * | 11/2016 | Gruenwald | H04B 7/0617 |
| 2017/0038581 A1 * | 2/2017 | Gilboa | G02B 26/101 |
| 2017/0090032 A1 | 3/2017 | Ridderbusch | |
| 2017/0090034 A1 | 3/2017 | Ridderbusch | |

(Continued)

*Primary Examiner* — Jennifer D Bennett

(74) *Attorney, Agent, or Firm* — Kevin D. Wills

(57) ABSTRACT

A light detection and ranging system includes synchronously scanning transmit and receive mirrors that scan a pulsed fanned laser beam in two dimensions. Imaging optics image a receive aperture onto an arrayed receiver that includes a plurality of light sensitive devices. A phase offset may be injected into a scanning trajectory to mitigate effects of interfering light sources.

20 Claims, 13 Drawing Sheets

(56) References Cited

U.S. PATENT DOCUMENTS

| | | |
|---|---|---|
| 2017/0131388 A1 | 5/2017 | Campbell et al. |
| 2017/0153319 A1 | 6/2017 | Villeneuve et al. |
| 2017/0176596 A1 | 6/2017 | Shpunt et al. |
| 2017/0205873 A1 | 7/2017 | Shpunt et al. |
| 2017/0244955 A1 | 8/2017 | Shpunt et al. |
| 2018/0088236 A1 | 3/2018 | Eichenholz et al. |
| 2018/0120433 A1 | 5/2018 | Eichenholz et al. |
| 2018/0372851 A1* | 12/2018 | Kienzler ............... G01S 7/4876 |
| 2020/0150209 A1* | 5/2020 | Kirillov ................. G01S 17/10 |
| 2020/0183013 A1* | 6/2020 | Iguchi .................. G01S 17/931 |

\* cited by examiner

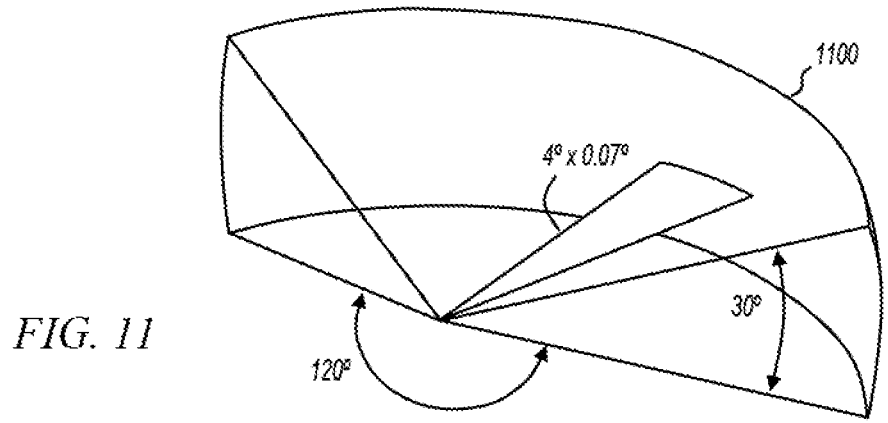
*FIG. 11*
*FIG. 12*
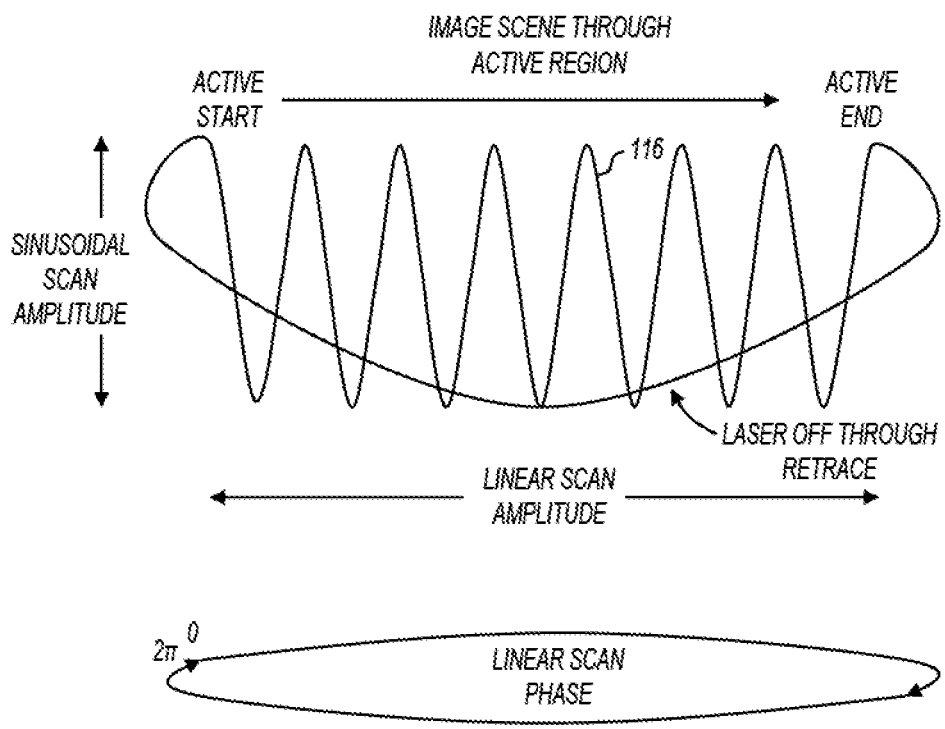

VARIABLE PHASE SCANNING LIDAR SYSTEM

FIELD

The present invention relates generally to light detection and ranging (LIDAR) systems, and more specifically to scanning LIDAR systems.

BACKGROUND

Scanning LIDAR systems typically scan laser light pulses in a field of view and measure round-trip time-of-flight of reflections to determine distances to reflection points in the field of view. When a scanning LIDAR system detects light from sources other than itself, errors may occur in measurements. For example, ambient light can cause errors, especially if very bright. Also, for example, other sources of pulsed laser light may cause measurement errors in scanning LIDAR systems.

BRIEF DESCRIPTION OF THE DRAWINGS

FIG. 11 shows a fanned beam in a field of view in accordance with various embodiments of the present invention;

FIG. 12 shows a scanning trajectory with retrace in accordance with various embodiments of the present invention;

DESCRIPTION OF EMBODIMENTS

Figure 1:
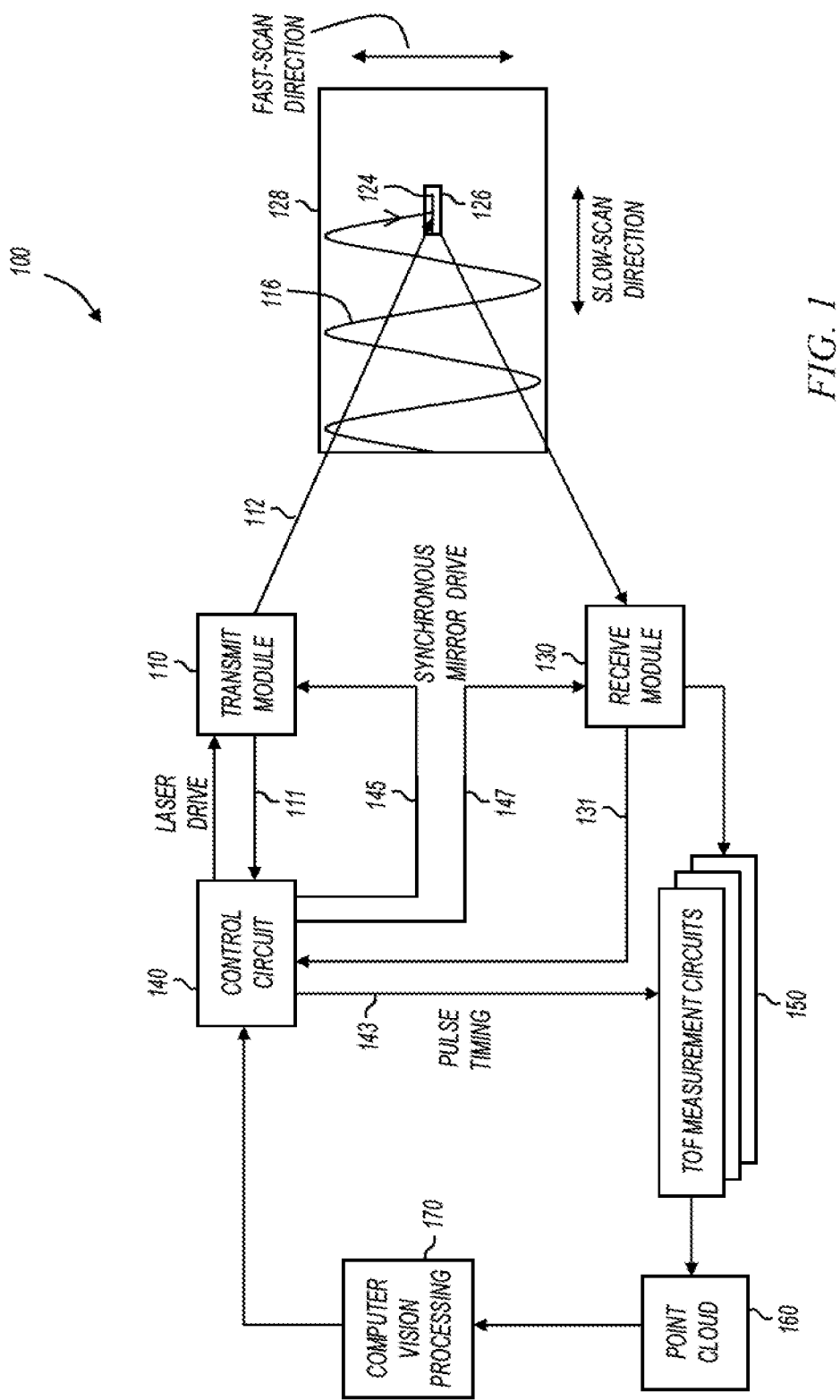
FIG. 1 shows a variable phase scanning LIDAR system in accordance with various embodiments of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 shows a variable phase scanning LIDAR system in accordance with various embodiments of the present invention. System 100 includes control circuit 140, transmit module 110, receive module 130, time-of-flight (TOF) measurement circuits 150, point cloud storage device 160, and computer vision processing 170.

Transmit module 110 emits a scanning pulsed fanned laser beam 112 that traverses a field of view 128 in two dimensions. The shape of the fanned beam is shown at 124, and the scanning trajectory that the pulsed fanned beam takes through the field of view is shown at 116. To produce the scanning pulsed fanned beam, transmit module 110 includes a laser light source to produce a pulsed laser beam, collimating and focusing optics to shape the pulsed laser beam into a pulsed fanned laser beam, and one or more scanning mirrors to scan the pulsed fanned laser beam in two dimensions in the field of view. Example embodiments of transmit modules are described more fully below with reference to later figures.

Receive module 130 includes an arrayed receiver that includes a plurality of light sensitive devices. Receive module 130 also includes optical devices and one or more scanning mirrors to scan in two dimensions and to direct reflected light from the field of view to the arrayed receiver. As shown in FIG. 1, receive module 130 captures reflected light from an aperture 126 that encompasses the location of the fanned beam in the field of view. Example embodiments of receive modules are described more fully below with reference to later figures.

The reflected fanned beam becomes "discretized" by the array of light sensitive devices, and the corresponding points in the field of view from which the beam is reflected are referred to herein as "measurement points."

As used herein, the term "fanned beam" refers to a beam of light that has been purposely shaped to encompass more measurement points in one dimension than in another dimension. For example, as shown in FIG. 1, fanned beam 112 includes shape 124 that encompasses more measurement points in the horizontal dimension than in the vertical dimension.

Time-of-flight (TOF) measurement circuits 150 are each coupled to one of the light sensitive devices in the arrayed receiver to measure a time-of-flight of a laser pulse. TOF measurement circuits 150 receive laser light pulse timing information 143 from control circuit 140 and compare it to the timing of received laser light pulses to measure round trip times-of-flight of light pulses, thereby measuring the distance (Z) to the point in the field of view from which the laser light pulse was reflected. Accordingly, TOF measurement circuits 150 measure the distance between LIDAR system 100 and measurement points in the field of view at which light pulses from the scanned fanned beam are reflected.

TOF measurement circuits 150 may be implemented with any suitable circuit elements. For example, in some embodiments, TOF measurement circuits 150 include digital and/or analog timers, integrators, correlators, comparators, registers, adders, or the like to compare the timing of the reflected laser light pulses with the pulse timing information received from control circuit 140.

Point cloud storage 160 receives TOF information corresponding to distance (Z) information from TOF measurement circuits 150. In some embodiments, the TOF measurements are held in point cloud storage 160 in an array format such that the location within point cloud storage 160 indicates the location within the field of view from which the measurement was taken. In other embodiments, the TOF measurements held in point cloud storage 160 include (X,Y) position information as well as TOF measurement information to yield (X,Y,Z) as a three dimensional (3D) data set that represents a depth map of the measured portion of the field of view 128. The point cloud data may then be used for any suitable purpose. Examples include 3D imaging, velocity field estimation, object recognition, interference detection, adaptive field of view modifications, laser light property modifications, and the like.

Point cloud storage 160 may be implemented using any suitable circuit structure. For example, in some embodiments, point cloud storage 160 is implemented in a dual port memory device that can be written on one port and read on a second port. In other embodiments, point cloud storage 160 is implemented as data structures in a general purpose memory device. In still further embodiments, point cloud storage 160 is implemented in an application specific integrated circuit (ASIC).

Computer vision processing 170 performs analysis on the point cloud data and provides feedback to control circuit 140. For example, in some embodiments, computer vision processing 170 performs object identification, classification, and tracking within the field of view, and provides this information to control circuit 140. Also for example, in some embodiments, computer vision processing 170 detects anomalies in the point cloud data for the purpose of interference detection. Computer vision processing 170 may take any form, including neural networks of any depth, convolutional neural nets, traditional vision processing methods, and the like. In some embodiments, computer vision processing 170 is omitted.

Control circuit 140 determines laser drive properties and drives transmit module 110 with signal(s) that cause the light source to emit laser light pulses having the specified properties. For example, control circuit 140 may determine values for laser drive power, pulse rate, pulse width, and number of multishot pulses. Further, control circuit 140 may adaptively modify the laser drive properties in response to feedback from computer vision processing 170.

Control circuit 140 also controls the movement of scanning mirrors within transmit module 110 and receive module 130. For example, control circuit 140 may drive microelectromechanical (MEMS) mirrors within transmit module 110 with drive signal(s) 145 and also may drive mirrors within receive module 130 with drive signal(s) 147 that cause the mirrors to move non-resonantly through angular extents of mirror deflection with angular offsets that define the size and location of field of view 128. Control circuit 140 synchronizes the movement between mirrors in transmit module 110 and receive module 130 so that aperture 126 is continually positioned in the field of view to receive light reflected from objects that are illuminated with pulsed fanned beam 112. The synchronization of transmit and receive scanning allows the receive aperture 126 to only accept photons from the portion of the field of view where the transmitted energy was transmitted. This results in significant ambient light noise immunity.

Control circuit 140 also controls the phase of the scanning trajectory 116. In some embodiments, control circuit 140 injects a phase offset in drive signals 145, 147 in the slow-scan direction to avoid interference caused by other light sources. In operation, control circuit 140 receives mirror position feedback information 111 from transmit module 110, and also receives mirror position feedback information 131 from receive module 130. The mirror position feedback information is used to phase lock the operation of the mirrors and also to control phase offsets.

Control circuit 140 is implemented using functional circuits such as phase lock loops (PLLs), filters, adders, multipliers, registers, processors, memory, and the like. Accordingly, control circuit 140 may be implemented in hardware, software, or in any combination. For example, in some embodiments, control circuit 140 is implemented in an application specific integrated circuit (ASIC). Further, in some embodiments, some of the faster data path control is performed in an ASIC and overall control is software programmable.

As shown in FIG. 1, the two dimensional scanning is performed in a first dimension (vertical, fast-scan direction) and a second dimension (horizontal, slow-scan direction). The labels "vertical" and "horizontal" are somewhat arbitrary, since a 90 degree rotation of the apparatus will switch the horizontal and vertical directions. Accordingly, the terms "vertical" and "horizontal" are not meant to be limiting.

The scanning trajectory in the fast-scan direction is shown as sinusoidal, and the scanning trajectory in the slow-scan direction is shown as constant velocity, although this is not a limitation of the present invention. In some embodiments, all mirror motion is operated non-resonantly. Accordingly, a relatively flat control band exists down to and including 0 Hz. This allows a drive signal to be generated to cause the pointing angle (boresight) of the LIDAR system to deflect to a desired position in two dimensions (azimuth & elevation) of a spherical coordinate space, offset from the mirror relaxation point. This also allows reasonably abrupt phase discontinuities to be injected into the mirror movement.

The angular extents of mirror deflection of both the transmit and receive modules can be adjusted to change the active field of view of the LIDAR system. The MEMS mirrors are designed for reliable operation at some maximum angle of deflection in each scan direction. From that nominal/max operating point, the drive amplitude may be reduced to collapse the deflection angle and narrow the active field of view. All else being equal, this results in a proportional increase in the angular resolution of the acquired scene.

Figure 2:
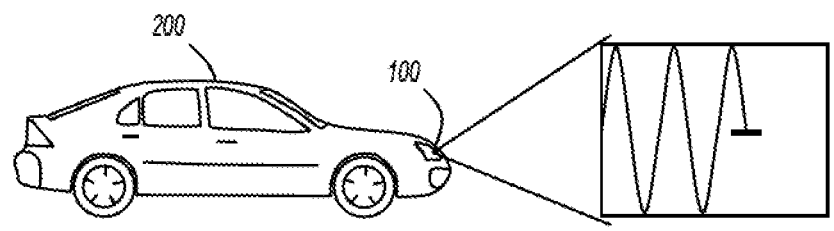
FIG. 2 shows an automotive application of a variable phase scanning LIDAR system in accordance with various embodiments of the present invention.

FIG. 2 shows an automotive application of a variable phase scanning LIDAR system in accordance with various embodiments of the present invention. As shown in FIG. 2, vehicle 200 includes LIDAR system 100 at the front of the vehicle. LIDAR system 100 synchronously scans transmit and receive scanning mirrors such that receive aperture 126 substantially overlaps the shape 124 of the pulsed fanned beam. Although much of the remainder of this description describes LIDAR systems in the context of an automotive application, the various embodiments of the present invention are not limited in this respect.

Figure 3:
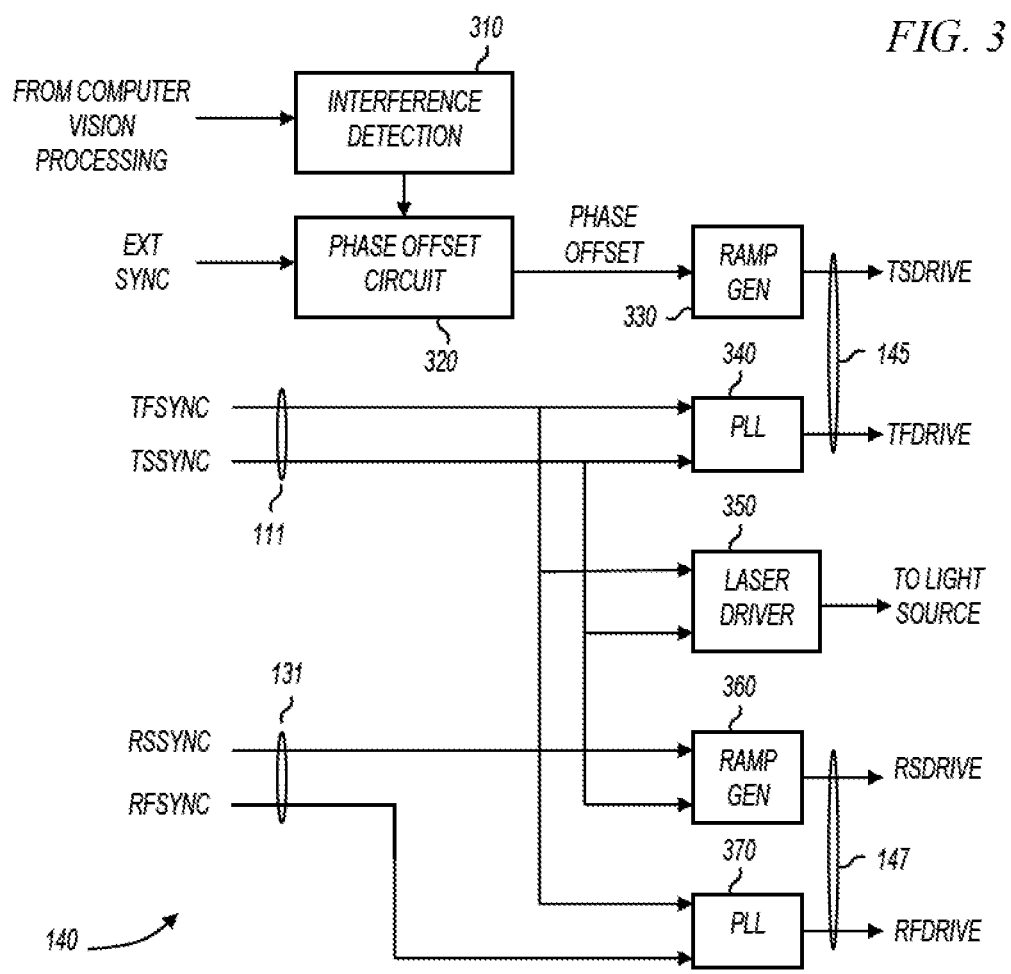
FIG. 3 shows a block diagram of a control circuit in accordance with various embodiments of the present invention.

FIG. 3 shows a block diagram of a control circuit in accordance with various embodiments of the present invention. The example embodiment shown in FIG. 3 corresponds to a control circuit that may be included when LIDAR system 100 is used in an automotive application. Other control circuit embodiments may be employed when used in applications other than automotive applications. Control circuit 140 includes interference detection circuit 310, phase offset circuit 320, ramp generation circuits 330, 360, laser driver 350, and phase lock loop circuits 340, 370.

In operation, control circuit 140 receives data from computer vision processing 170, transmit mirror position feedback 111 and receive mirror position feedback 131, and produces transmit mirror drive signals 145, receive mirror drive signals 147, and laser light source drive signals. Control circuit 140 also optionally receives an external sync signal to synchronize operation to one or more external systems. In embodiments represented by FIG. 3, the transmit mirror position feedback signals 111 include feedback in the fast-scan direction (TFSYNC) and feedback in the slow-scan direction (TSSYNC). Further, the receive mirror position feedback signals 131 include feedback in the fast-scan direction (RFSYNC) and feedback in the slow-scan direction (RSSYNC). Similarly, the transmit mirror drives signals 145 include a drive signal to effect movement in the slow-scan direction (TSDRIVE), and a drive signal to effect movement in the fast-scan direction (TFDRIVE), and the receive mirror drive signals 147 include a drive signal to effect movement in the slow-scan direction (RSDRIVE), and a drive signal to effect movement in the fast-scan direction (RFDRIVE).

The TSDRIVE signal is generated by ramp generation circuit 330. Ramp generation circuit 330 receives a phase offset value produced by phase offset circuit 320. As described further below, the phase of the TSDRIVE signal may be dynamically modified to avoid interference. In some embodiments, PLL 340 produces the TFDRIVE signal by phase locking TFSYNC to TSSYNC. In these embodiments, the phase of the scan trajectory in the fast-scan direction is phase locked to the scan trajectory in the slow-scan direction. Similarly, ramp generation circuit 360 produces RSDRIVE by phase locking RSSYNC to TFSYNC, and PLL 370 produces RFDRIVE 370 by phase locking RFSYNC to TFSYNC. Accordingly, RSDRIVE and RFDRIVE cause mirror motion in receive module 130 to be synchronous with mirror motion in transmit module 110.

Although PLLs are shown to phase lock the transmit and receive mirror positions together using feedback signals, this is not a limitation of the present invention. For example, in some embodiments, the phase offset information is applied directly in a feedforward manner to each mirror drive channel in addition to or in place of the feedback signals. In these embodiments, a shared phase accumulator between transmit and receive drive channels may have independently configurable phase offsets. Likewise, although separate drive signals are shown for each of the fast and slow-scan directions, this is not a limitation of the present invention. For example, in some embodiments, the drive signals are combined into a single drive signal to drive the transmit scanning mirror and a single drive signal to drive the receive scanning mirror.

Laser driver 350 receives transmit mirror position feedback 111 and produces drive signals to drive the laser light source in transmit module 110. In some embodiments, laser driver 350 drives the light source to repeatedly produce pulses at the same measurement points in the field of view for each scan trajectory. In other embodiments, laser driver 350 drives the light source to produce pulses at different measurement points in the field of view for each scan trajectory.

Interference detection circuit 310 receives information from computer vision processing 170. In some embodiments, computer vision processing 170 determines if anomalies exist in the point cloud data, and in other embodiments, interference detection circuit 310 determines if anomalies exist in the point cloud data. As described further below, various anomalies in the point cloud data may be indicative of an interfering source of light. In the case of interference detection, phase offset circuit 320 determines a phase offset in the slow-scan direction to be applied to the transmit and receive mirrors, and provides the phase offset value to ramp generation circuit 330. This phase offset value is then cascaded to the various transmit and receive drive channels by open and/or closed loop methods.

Interference detection circuit 310 and phase offset circuit 320 may be implemented with any suitable circuit structures. For example, in some embodiments, interference detection circuit 310 and phase offset circuit 320 may be implemented with processors, look-up tables, comparators, registers, adders, and the like.

Figure 4:
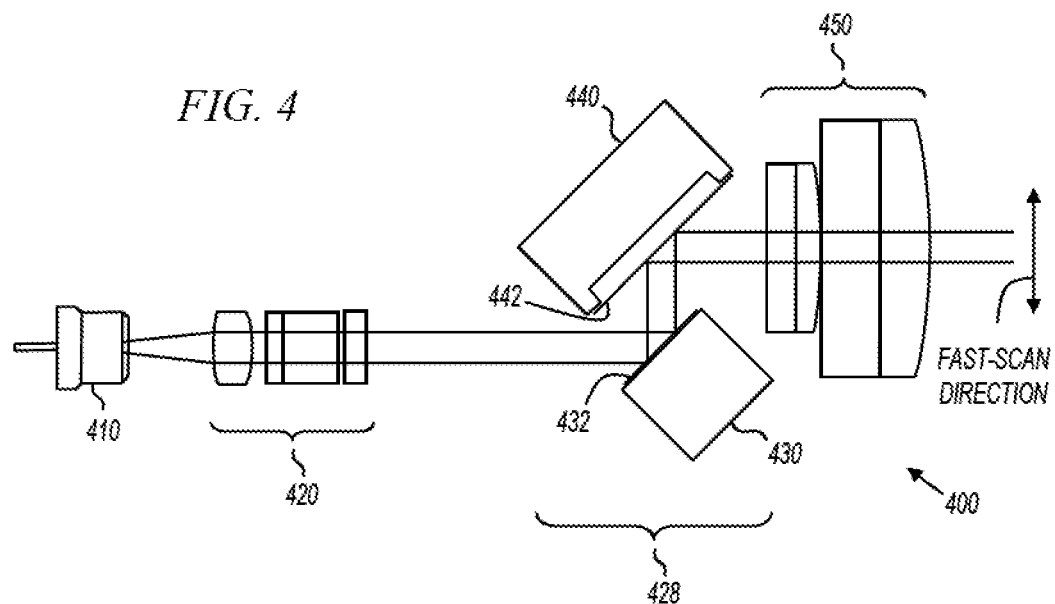
FIG. 4 shows a side view of a transmit module in accordance with various embodiments of the present invention.
Figure 5:
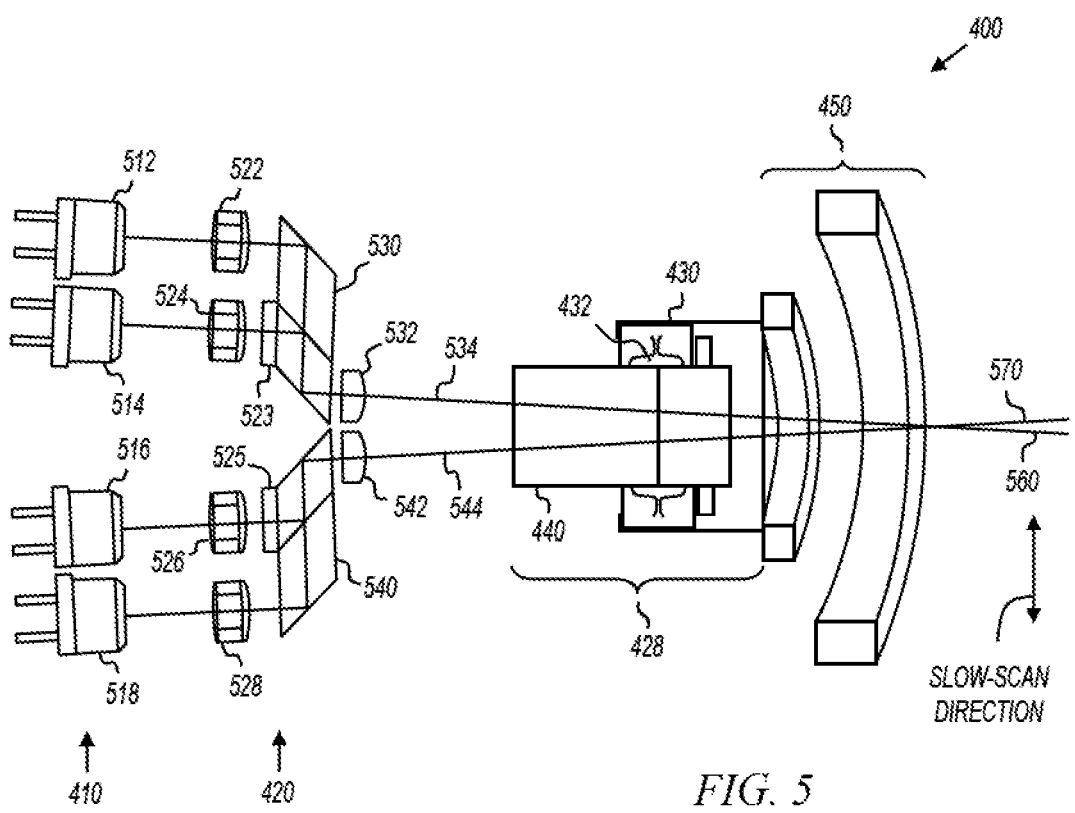
FIG. 5 shows a top view of a transmit module in accordance with various embodiments of the present invention.

FIG. 4 shows a side view and FIG. 5 shows a top view of a transmit module in accordance with various embodiments of the present invention. Transmit module 400 is an example embodiment of transmit module 110 (FIG. 1). Transmit module 400 includes laser light source 410, beam shaping optical devices 420, scanning mirror assembly 428, and exit optical devices 450.

In some embodiments, laser light source 410 sources nonvisible light such as infrared (IR) light. In these embodiments, the receive module 130 (FIG. 1) is able to detect the same wavelength of nonvisible light. For example, in some embodiments, light source 410 may include a laser diode that produces infrared light with a wavelength of substantially 905 nanometers (nm), and receive module 130 detects reflected light pulses with a wavelength of substantially 905 nm. Also for example, in some embodiments, light source 410 may include a laser diode that produces infrared light with a wavelength of substantially 940 nanometers (nm), and receive module 130 detects reflected light pulses with a wavelength of substantially 940 nm. The wavelength of light is not a limitation of the present invention. Any wavelength, visible or nonvisible, may be used without departing from the scope of the present invention.

Laser light source 410 may include any number or type of emitter suitable to produce a pulsed fanned laser beam. For example, in some embodiments, laser light source 410 includes multiple laser diodes shown in FIG. 5 at 512, 514, 516, and 518. Light beams emitted from laser diodes 512 and 514 are combined using polarization beam combining to form light beam 534, and light beams emitted from laser diodes 516 and 518 are combined using polarization beam combining to form light beam 544. For example, optical devices 522 and 524 collimate and focus the light from diodes 512, 514, and polarizing beam splitter 530 combines the beams after one of the beams passes through polarization rotator 523. The resulting beam is focused or expanded in the slow-scan direction by optical device 532 to create a fanned beam at 534. Also for example, optical devices 526 and 528 collimate and focus the light from diodes 516 and 518, and polarizing beam splitter 540 combines the beams after one of the beams passes through polarization rotator 525. The resulting beam is focused or expanded in the slow-scan direction by optical device 542 to create a fanned beam at 544.

In some embodiments, each of beams 534 and 544 may be collimated in the fast-scan direction with <0.2 degrees of divergence, and may be focused or expanded in the slow-scan direction to diverge at a rate that produces a fan angle of substantially four degrees. Beam sizes and divergence values are not necessarily uniform across the various embodiments of the present invention; some embodiments have higher values, and some embodiments have lower values.

Scanning mirror assembly 428 receives the pulsed fanned laser beams from optical devices 420 and scans the pulsed fanned beams in two dimensions. In embodiments represented by FIGS. 4 and 5, scanning mirror assembly 428 includes two separate scanning devices 430, 440, each including a scanning mirror 432, 442, where each scanning mirror scans the beams in one dimension. For example, scanning mirror 432 scans the pulsed fanned beams in the fast-scan (vertical) direction, and scanning mirror 442 scans the pulsed fanned beams in the slow-scan (horizontal) direction.

Scanning devices 430, 440 are driven by signals received from control circuit 140 (FIGS. 1, 3). For example, scanning mirror 432 may scan in one dimension through first angular extents with a first angular offset as a result of being driven by TFDRIVE, and scanning mirror 442 may scan in a second dimension through second angular extents with a second angular offset as a result of being driven by TSDRIVE. In some embodiments, the instantaneous angular deflection of scanning devices 430 and 440 are independently controlled, resulting in a completely configurable field of view along with configurable scan rates.

Although scanning mirror assembly 428 is shown as two mirrors, where each scans in a separate dimension, this is not a limitation of the present invention. For example, in some embodiments, scanning mirror assembly 428 is implemented using a single biaxial mirror that scans in two dimensions. In some embodiments, scanning devices uses electromagnetic actuation, achieved using a miniature assembly containing a MEMS die and small subassemblies of permanent magnets and an electrical interface, although the various embodiments are not limited in this respect. For example, some embodiments employ electrostatic or piezoelectric actuation. Any type of mirror actuation may be employed without departing from the scope of the present invention.

In some embodiments, scanning devices 430, 440 include one or more sensors to detect the angular position or angular extents of the mirror deflection (in one or both dimensions). For example, in some embodiments, scanning mirror 432 includes a piezoresistive sensor that produces a feedback signal TFSYNC that is proportional to the deflection of the mirror in the fast-scan direction. Further, in some embodiments, scanning mirror 442 includes an additional piezoresistive sensor that delivers a feedback signal TSSYNC that is proportional to the deflection of the mirror in the slow-scan direction. The mirror position information TFSYNC, TSSYNC is provided back to control circuit 140 to allow phase locked operation, as well as other control functions. For example, feedback control may be provided for mirror drive stability, noise cancellation, disturbance rejection, temperature compensation, drift compensation, and the like.

Exit optical devices 450 operate on the scanning pulsed fanned laser beam as it leaves the transmit module. In some embodiments, exit optical devices 450 perform field expansion. For example, scanning mirror assembly 428 may scan through maximum angular extents of 20 degrees in the fast-scan direction, and may scan through maximum angular extents of 40 degrees in the slow-scan direction, and exit optical devices 450 may expand the field of view to 30 degrees in the fast-scan direction and 120 degrees in the slow-scan direction. The relationship between scan angles of scanning mirrors and the amount of field expansion provided by exit optical devices 450 is not a limitation of the present invention.

In some embodiments, laser diodes 512, 514, 516, and 516 are high power multimode laser diodes. Multimode laser diodes typically have relatively large emitter areas that result in a beam that diverges faster on one axis than on the other axis. For example, an example 905 nm multimode laser diode may have a 10 um emitter oriented in the fast-scan direction and a 220 um emitter oriented in the slow-scan direction resulting in an emitted beam that inherently diverges faster in the slow-scan direction. Various embodiments take advantage of this non-uniform beam shape by collimating the beam in the direction that naturally diverges more slowly, and focusing or expanding the beam into a fan in the direction that naturally diverges more quickly.

Figure 6:
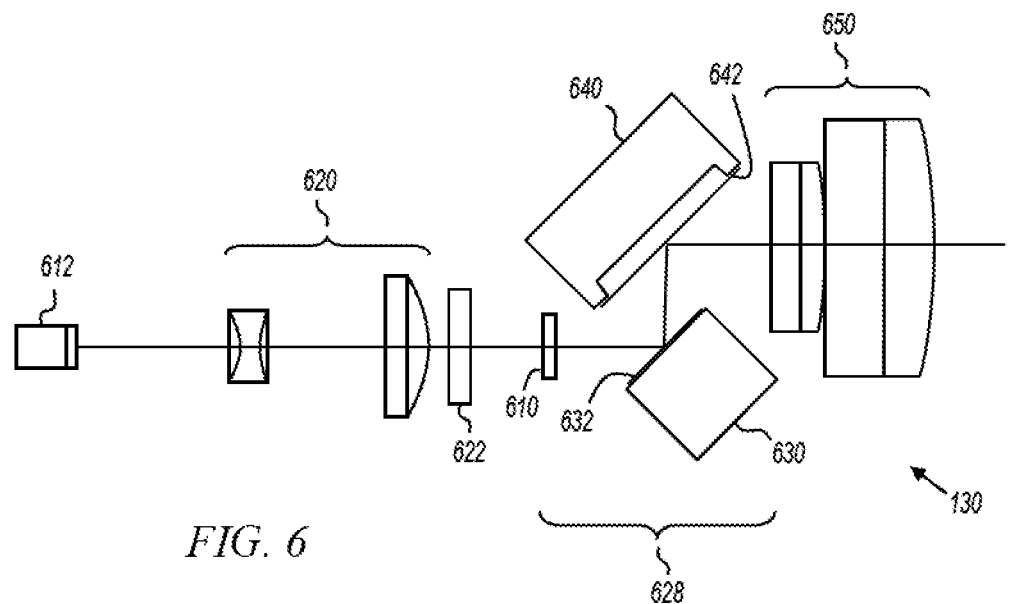
FIG. 6 shows a side view of a receive module in accordance with various embodiments of the present invention.
Figure 7:
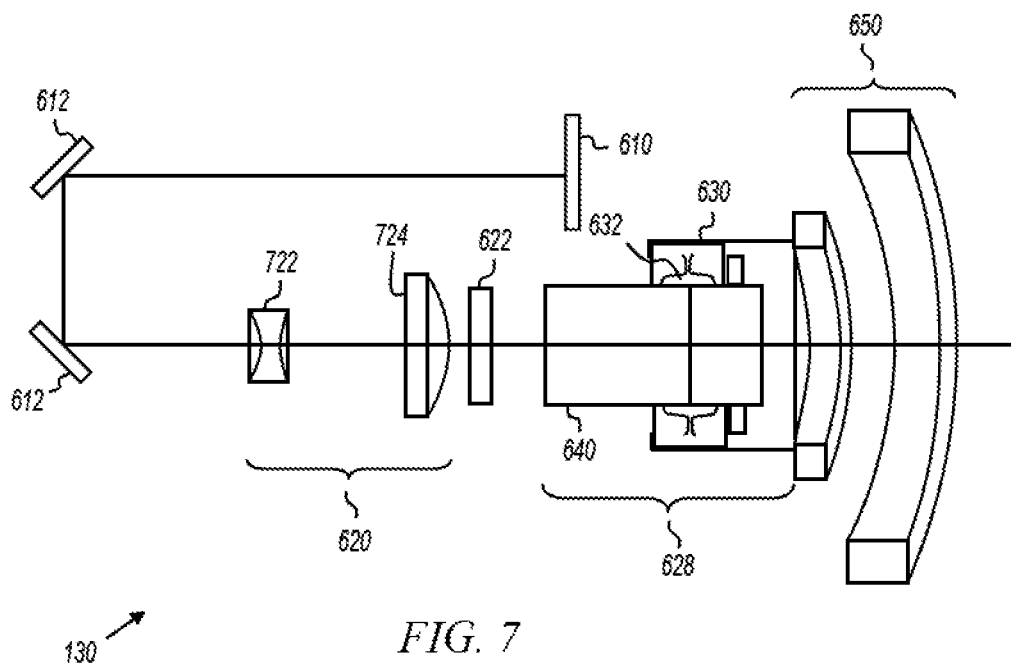
FIG. 7 shows a top view of a receive module in accordance with various embodiments of the present invention.

FIG. 6 shows a side view and FIG. 7 shows a top view of a receive module in accordance with various embodiments of the present invention. Receive module 130 includes arrayed receiver 610, fold mirrors 612, imaging optical devices 620, bandpass filter 622, scanning mirror assembly 628, and exit optical devices 650.

Scanning devices 630 and 640 are similar or identical to scanning devices 430 and 440, and exit optical devices 650 are similar or identical to exit optical devices 450. Bandpass filter 622 passes the wavelength of light that is produced by laser light source 410, and blocks ambient light of other wavelengths. For example, in some embodiments, laser light source 410 produces light at 905 nm, and bandpass filter 622 passes light at 905 nm.

Imaging optical devices 620 image a portion of the field of view onto arrayed receiver 610 after reflection by fold mirrors 612. For example, in some embodiments, optical devices 620 image the aperture 126 (FIG. 1) onto arrayed receiver 610. Because scanning mirror assembly 628 is scanned synchronously with scanning mirror assembly 428, arrayed receiver 610 always collects light from the measurement points illuminated by the scanned pulsed fanned beam.

Arrayed receiver 610 includes an array of light sensitive devices. The array of light sensitive devices may be one-dimensional or two-dimensional. For example, in some embodiments, arrayed receiver 610 includes a 1×M array of PIN photodiodes, Silicon photomultipliers (SiPM), avalanche photodiodes (APD), or the like, where M is any integer. Also for example, in some embodiments, arrayed receiver 610 includes a N×M array of PIN photodiodes, Silicon photomultipliers (SiPM), avalanche photodiodes (APD), or the like, where N and M are any integers. Any number of light sensitive devices may be included without departing from the scope of the present invention. For example, in some embodiments, 16 light sensitive devices are included, and in other embodiments, 24 light sensitive devices are included.

Scanning devices 630, 640 are driven by signals received from control circuit 140 (FIGS. 1, 3). For example, scanning mirror 632 may scan in one dimension through first angular extents with a first angular offset as a result of being driven by RFDRIVE, and scanning mirror 642 may scan in a second dimension through second angular extents with a second angular offset as a result of being driven by RSDRIVE. In some embodiments, the instantaneous angular deflection of scanning devices 630 and 640 are independently controlled, resulting in a completely configurable field of view along with configurable scan rates.

Although scanning mirror assembly 628 is shown as two mirrors, where each scans in a separate dimension, this is not a limitation of the present invention. For example, in some embodiments, scanning mirror assembly 628 is implemented using a single biaxial mirror that scans in two dimensions. In some embodiments, scanning devices uses electromagnetic actuation, achieved using a miniature assembly containing a MEMS die and small subassemblies of permanent magnets and an electrical interface, although the various embodiments are not limited in this respect. For example, some embodiments employ electrostatic or piezoelectric actuation. Any type of mirror actuation may be employed without departing from the scope of the present invention.

In some embodiments, scanning devices 630, 640 include one or more sensors to detect the angular position or angular extents of the mirror deflection (in one or both dimensions). For example, in some embodiments, scanning mirror 632 includes a piezoresistive sensor that produces a feedback signal RFSYNC that is proportional to the deflection of the mirror in the fast-scan direction. Further, in some embodiments, scanning mirror 642 includes an additional piezoresistive sensor that delivers a feedback signal RSSYNC that is proportional to the deflection of the mirror in the slow-scan direction. The mirror position information RFSYNC, RSSYNC is provided back to control circuit 140 to allow phase locked operation, as well as other control functions. For example, feedback control may be provided for mirror drive stability, noise cancellation, disturbance rejection, temperature compensation, drift compensation, and the like.

Figure 8:
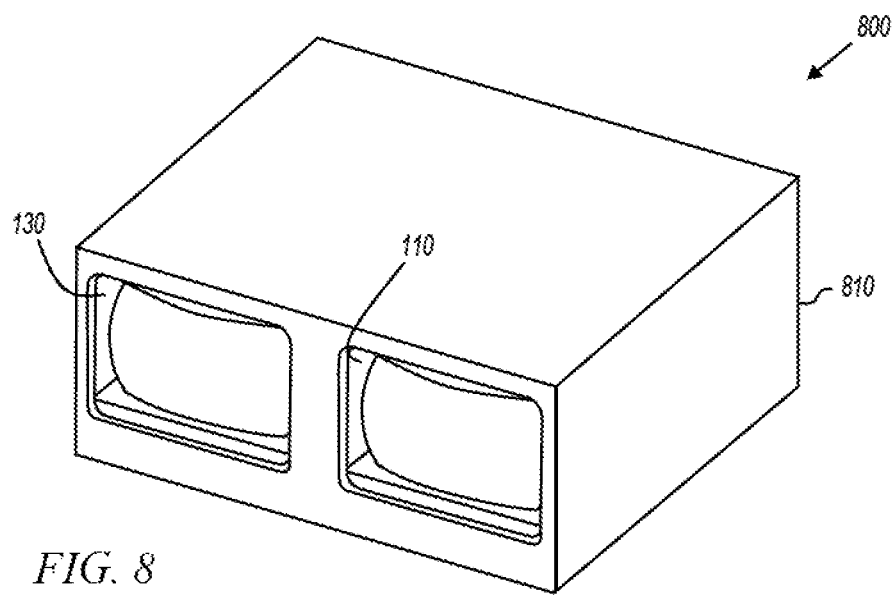
FIG. 8 shows a perspective view of an integrated photonics module in accordance with various embodiments of the present invention.

FIG. 8 shows a perspective view of an integrated photonics module in accordance with various embodiments of the present invention. Integrated photonics module 800 is shown having a rectangular housing 810 with transmit module 110 and receive module 130 placed side by side. In some embodiments, transmit module 110 and receive module 130 are placed one on top of the other. The relative orientation of transmit module 110 and receive module 130 is not a limitation of the present invention.

Figure 9:
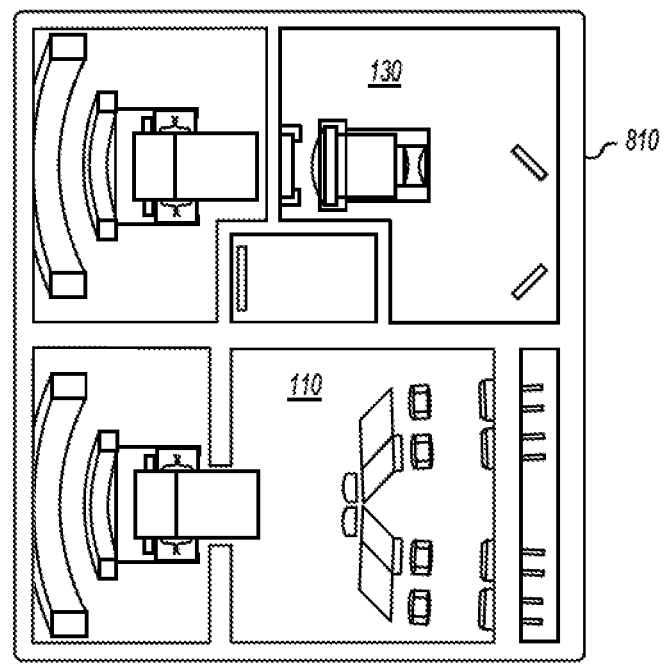
FIG. 9 shows a cross sectional top view of the integrated photonics module of FIG. 8.
Figure 10:
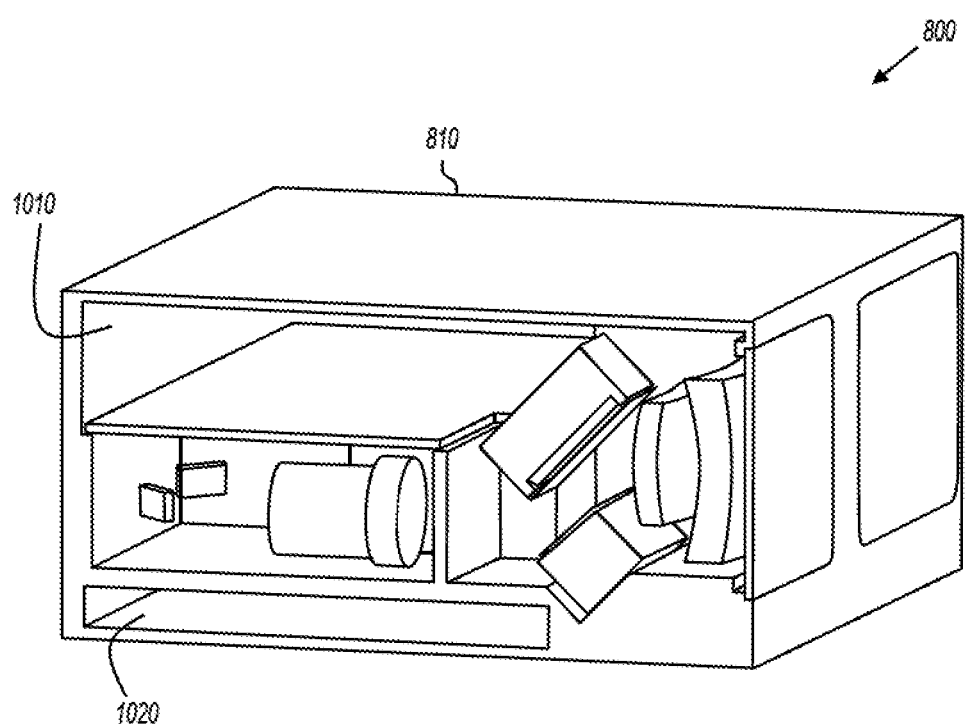
FIG. 10 shows a cross sectional perspective view of the integrated photonics module of FIG. 8.

FIG. 9 shows a cross sectional top view and FIG. 10 shows a cross sectional perspective view of the integrated photonics module of FIG. 8. Transmit module 110 and receive module 130 are shown side by side. In some embodiments, space is provided for electronics above (1010) and below (1020) the rearmost optical devices in integrated photonics module 800. Any amount of system electronics may be included within module 800. For example, in some embodiments, all components shown in FIG. 1 are included in module 800. Also for example, in some embodiments, only control circuits and TOF measurement circuits are included in module 800.

FIG. 11 shows a fanned beam in a field of view in accordance with various embodiments of the present invention. The field of view 1100 in the example of FIG. 11 spans 120 degrees horizontally and 30 degrees vertically. This corresponds to the example provided with reference to FIG. 4 in which the transmit module exit optics expand the field of view to 120 degrees by 30 degrees. The pulsed fanned laser beam in FIG. 11 is four degrees in the horizontal direction and 0.07 degrees in the vertical direction. In some embodiments, the pulsed fanned laser beam has a fan angle greater than four degrees, and in other embodiments, the pulsed fanned laser beam has a fan angle less than four degrees. Further in some embodiments, the pulsed fanned laser beam is taller than 0.07 degrees, and in other embodiments, the pulsed fanned laser beam is shorter than 0.07 degrees.

As described above, the fanned beam is scanned in two dimensions in the field of view. The fast-scan direction is usually, but not necessarily, oriented vertically, and the slow-scan direction is usually, but not necessarily, oriented horizontally. The scan frequency in the slow-scan direction relative to the scan frequency in the fast-scan direction determines the number of fast scan passes per slow scan pass. Each slow scan pass is referred to herein as a "frame." The ratio of width (in degrees of field of view) of the fast scan cycle to laser beam fan angle determines the number of frames per complete scene acquisition.

The field of view may be run at a reduced angle relative to the maximum operating point by modifying angular extents. This can be used to alter the ratio of fast scan cycle width (in degrees field of view to laser beam fan angle and the resulting scan/fill pattern of the TOF pulses. Furthermore, due to the completely non-resonant drive scanning mirror system design, a pointing angle offset may be applied in two dimensions by modifying angular offsets to shift the reduced imaging area inside the accessible scene.

FIG. 12 shows a scanning trajectory with retrace in accordance with various embodiments of the present invention. In some embodiments, the scanning trajectory 116 is sinusoidal in the fast-scan direction and linear in the slow-scan direction. Scanning trajectory 116 includes an active region and a retrace region in the slow-scan direction, and laser light pulses are only emitted in the active region. The amplitude of the active scan in both directions determines the field of view that is imaged in a scene. No laser energy is emitted in retrace, as the mirror transitions from the end of the field of view back to the beginning in preparation for another scan sweep through the scene. In some embodiments a triangle wave trajectory is used instead of the sawtooth trajectory illustrated here, in which case the active and retrace intervals are replaced by a pair of bidirectional scan periods.

Figure 13:
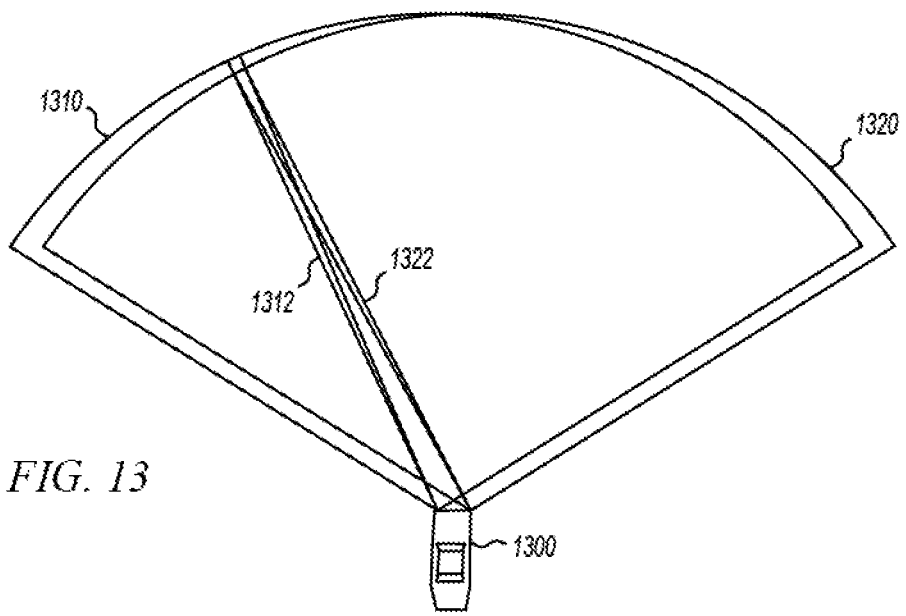
FIGS. 13 and 14 show LIDAR interference scenarios in accordance with various embodiments of the present invention.
Figure 14:
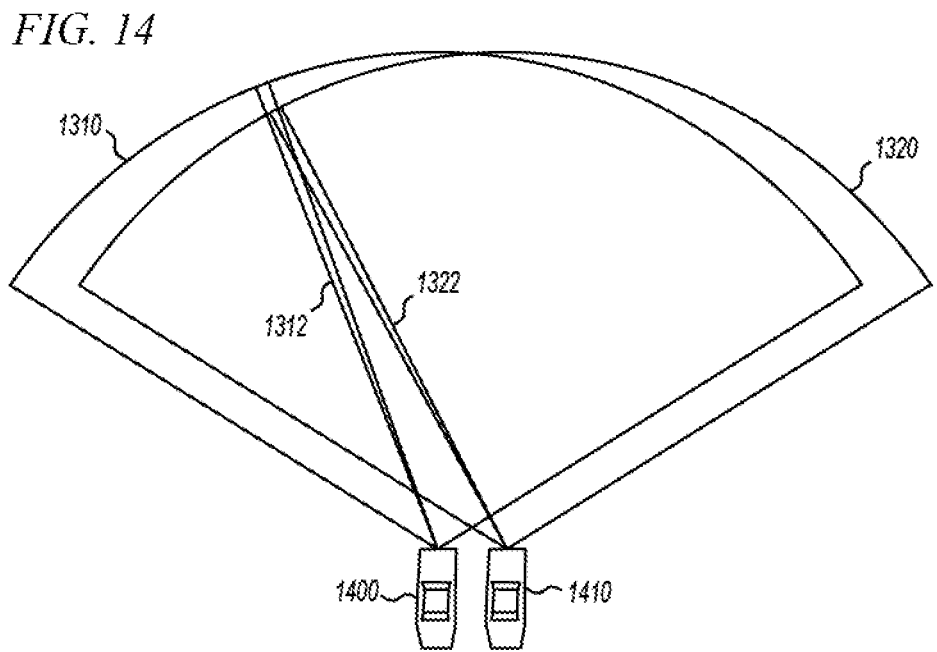

FIGS. 13 and 14 show LIDAR interference scenarios in accordance with various embodiments of the present invention. FIG. 13 shows a top view of a single vehicle 1300 with two LIDAR systems. The first LIDAR system emits a fanned beam 1312 in field of view 1310 and the second LIDAR system emits a fanned beam 1322 in field of view 1320. As shown in FIG. 13, it is possible that light emitted from a first LIDAR system may interfere with the operation of a second LIDAR system. For example, the system that emits fanned beam 1312 may receive reflections from fanned beam 1322, thereby causing errors. Also for example, the system that emits fanned beam 1322 may receive reflections from fanned beam 1312, thereby causing errors. FIG. 14 shows a similar interference scenario, where the two LIDAR systems are located in two separate vehicles 1400, 1410.

Figure 15:
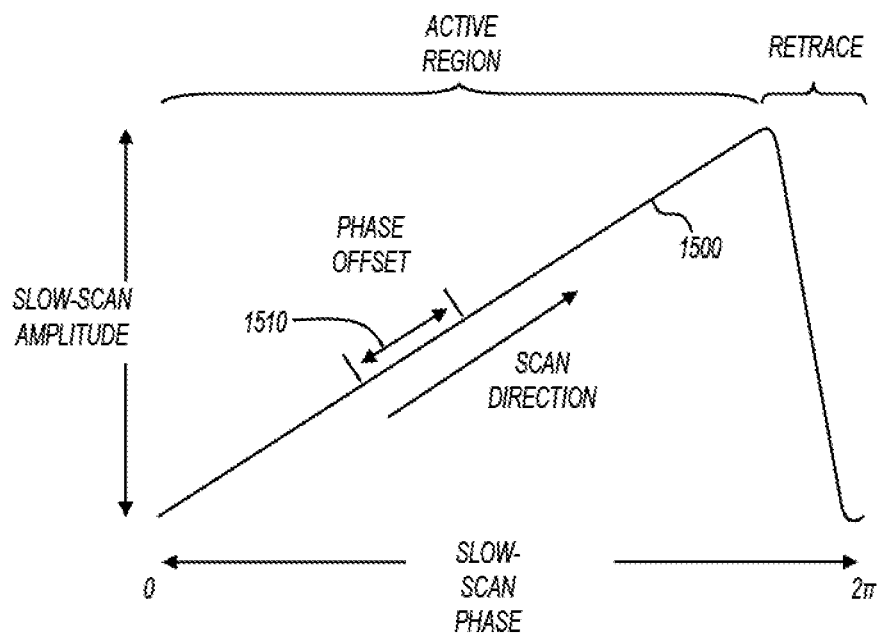
FIGS. 15 and 16 shows phase offsets in a scanning trajectory in accordance with various embodiments of the present invention.
Figure 16:
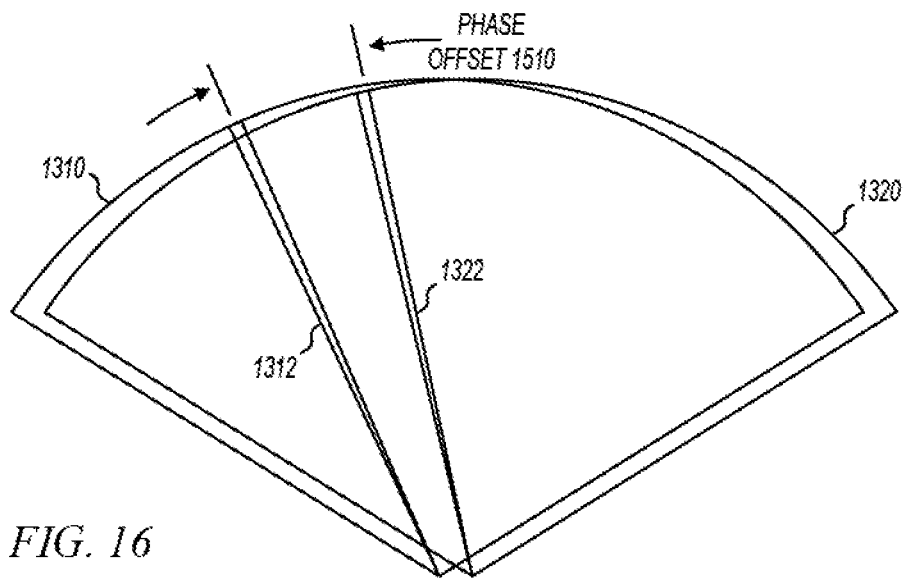

FIGS. 15 and 16 show phase offsets in a scanning trajectory in accordance with various embodiments of the present invention. As shown in FIG. 15, ramp 1500 represents an example slow-scan trajectory. The slow-scan trajectory is linear in the active region, and then linear with a greater slope in the retrace region, although this is not a limitation of the present invention. Any slow-scan trajectory (sawtooth ramp, triangular ramp or otherwise) may be utilized without departing from the scope of the present invention.

Various embodiments of the present invention resolve interference scenarios by injecting a phase offset into a scan trajectory to avoid spatiotemporal overlap of scanning trajectories between systems. For example, if interference is detected, a phase offset 1510 may be added to the slow-scan trajectory. FIG. 16 shows a top view of the two scan trajectories of FIGS. 13 and 14 with phase offset 1510 applied.

Once a suitable phase offset has been applied, multiple systems may continue to occupy the same active field of view without additional phase offsets so long as they are operating at the same frequency and are scheduled sufficiently apart in scan phase.

Figure 17:
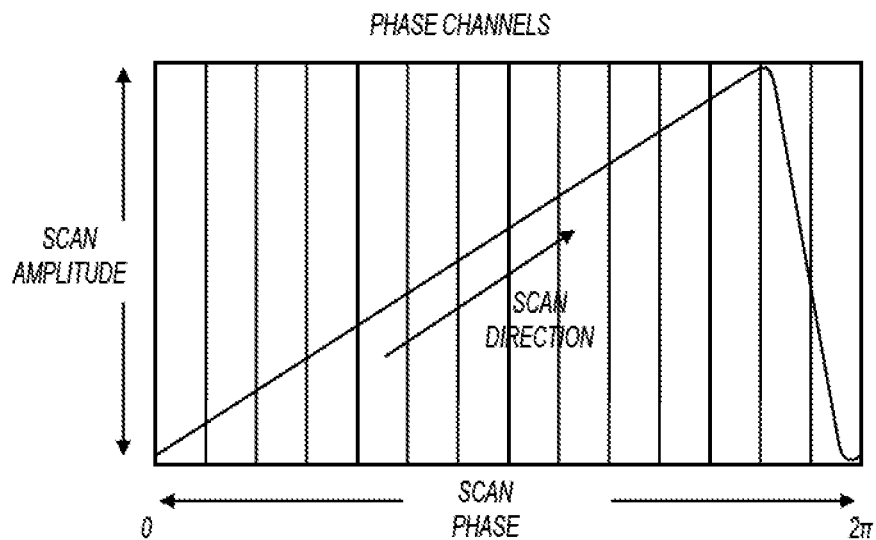
FIG. 17 shows phase channels in accordance with various embodiments of the present invention.

FIG. 17 shows phase channels in accordance with various embodiments of the present invention. FIG. 17 shows a number of discrete phase "channels," each having a sufficient phase separation from its nearest neighbor to allow operation of different systems in adjacent channels. The required phase separation is a function of spot size, sensor disparity, and control tolerances. It may be designed for various widths to meet situational needs, where the width of the phase separation determines the capacity of the system to handle and schedule multiple interferers.

Figure 18:
FIGS. 18 and 19 show a field of view region with a low expected distance variation in accordance with various embodiments of the present invention.
Figure 19:
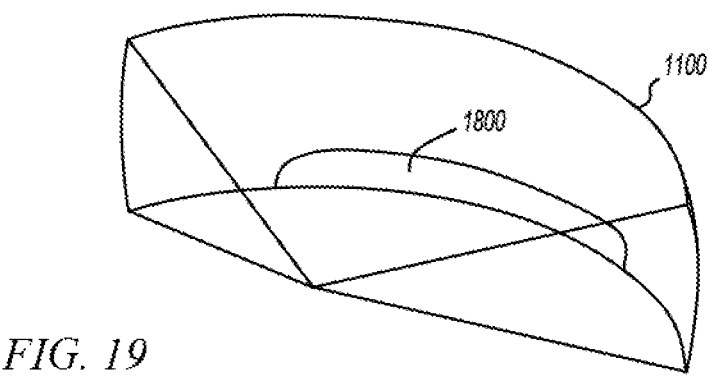

FIGS. 18 and 19 show a field of view region with a low expected distance variation in accordance with various embodiments of the present invention. In some embodiments, using distance information from the lowest few elevation lines of the imaged field of view (shown at 1800), it is possible to detect the presence of continuous interference patterns and respond by commanding a new phase offset to break up the pattern.

Based on the physical location of the LIDAR system in the vehicle, the distance to the driving surface is known at calibration time and should experience very little variation during operation. Changes to the driving surface will typically be gentle and/or regular. In some embodiments, measurement anomalies detected in this region of the field of view indicate the presence of an interfering light source. For example, a large degree of high frequency variation in the sensed depth in this region may be indicative of a nearby interferer that has come into near phase-frequency lock with the ego sensor. Also for example, in other embodiments, sensed depths beyond a threshold value may also be indicative of a nearby interferer. In general, any anomaly detectable in region 1100 may be indicative of an interfering light source, the effects of which may be mitigated by injecting a phase offset.

Figure 20:
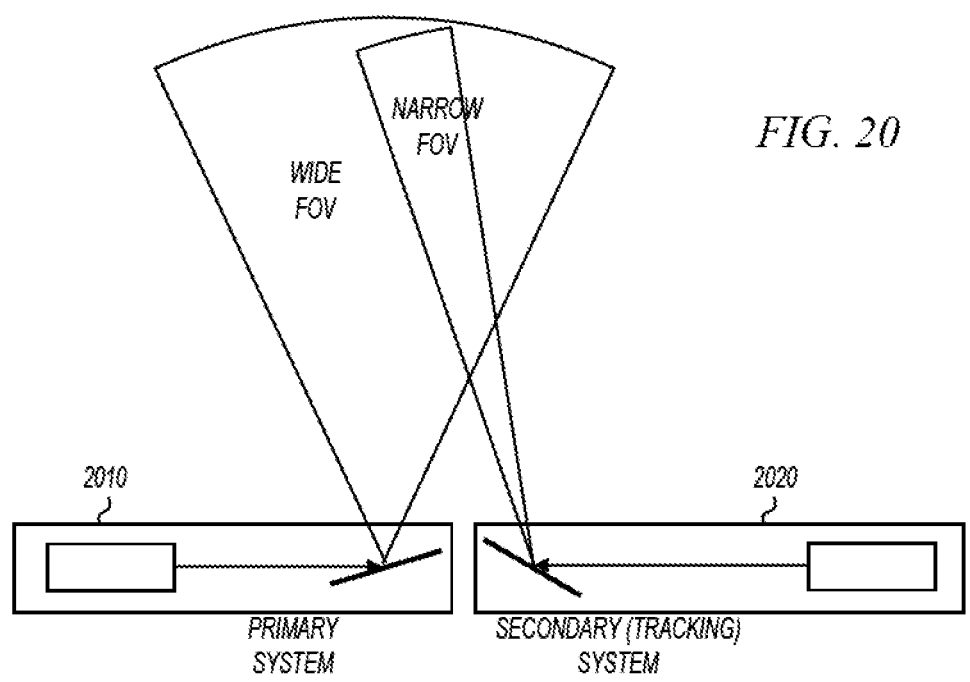
FIG. 20 shows two LIDAR systems with different fields of view in accordance with various embodiments of the present invention.

FIG. 20 shows two LIDAR systems with different fields of view in accordance with various embodiments of the present invention. Example embodiments represented by FIG. 20 employ multiple scanning LIDAR systems, a primary system 2010 for imaging a wide field of view at a fixed frequency and a secondary system 2020 for tracking objects at higher detail levels within a limited field of view based on input from the primary system. The secondary system may include one or more mirrors that effectively scan a narrow region thereby producing high-resolution and low latency output of detected objects, dramatically improving perception performance. In these embodiments, either or both of the primary and secondary system may modulate its phase to maintain interference free operation.

Figure 21:
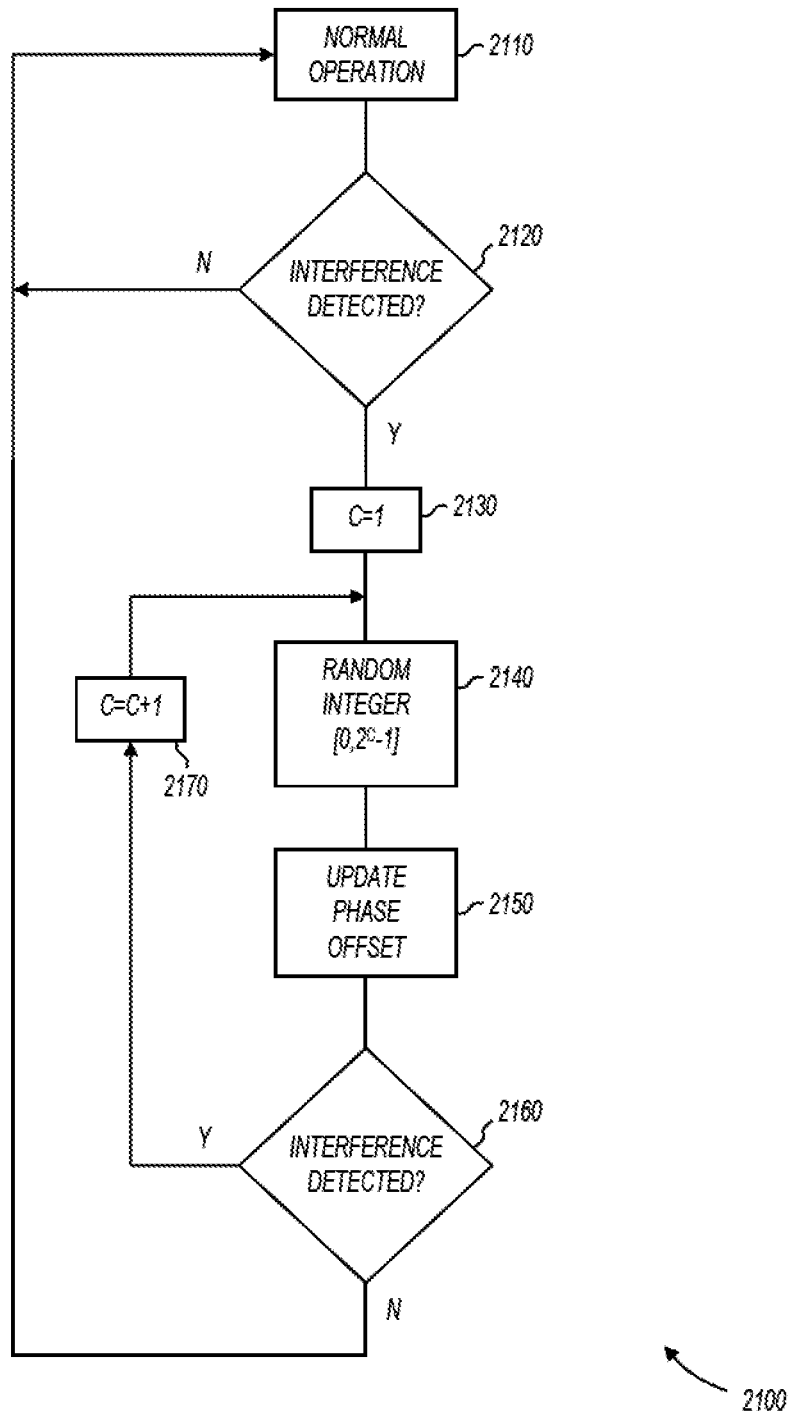
FIGS. 21 and 22 show flow diagrams of methods in accordance with various embodiments of the present invention.

FIG. 21 shows a flow diagram of methods in accordance with various embodiments of the present invention. In some embodiments, method 2100, or portions thereof, is performed by a scanning LIDAR system or a scanning LIDAR module. In other embodiments, method 2100 is performed by a series of circuits or an electronic system. For example, method 2100 may be performed by control circuit 140 (FIG. 3). Method 2100 is not limited by the particular type of apparatus performing the method. The various actions in method 2100 may be performed in the order presented, or may be performed in a different order. Further, in some embodiments, some actions listed in FIG. 21 are omitted from method 2100.

Method 2100 is shown beginning with block 2110 in which the system is in normal operation, and the system remains in normal operation as long as interference is not detected at 2120. In some embodiments, interference is detected when one or more anomalies appear in point cloud data. For example, high frequency variations in point cloud data in a region of the field of view may be indicative of an interfering light source. Also for example, measured distance values beyond a threshold may be indicative of an interfering light source.

When interference is detected at 2120, a collision is signaled, and a collision resolution action is performed, akin to that of a CSMA (carrier-sense multiple access) scheme, where a different phase offset is repeatedly chosen until the interference is no longer detected at 2160. In some embodiments, an "exponential backoff" algorithm is utilized, whereby a new phase offset is chosen based on a random additive offset (phase_width*rand[2c−1]) based on the number of persistent collision events, c. The new phase would be scheduled modulo $2\pi$. This is shown in FIG. 2100 at 2130, 214, 215, 2160, and 2170**.

Although an exponential backoff algorithm is depicted in FIG. 2100, the various embodiments of the invention are not limited in this respect. For example, other backoff algorithms (non-exponential) may be employed, or simple linear selection methods may be employed. Any method of determining phase offsets may be employed without departing from the scope of the present invention.

Figure 22:
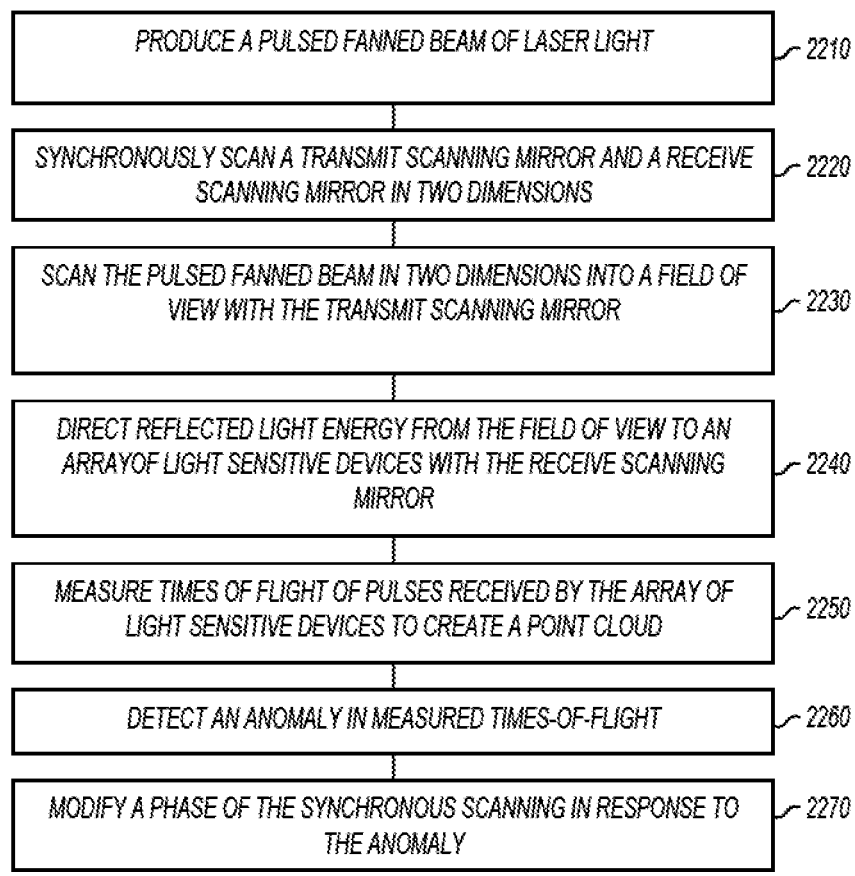

FIG. 22 shows a flow diagram of methods in accordance with various embodiments of the present invention. In some embodiments, method 2200, or portions thereof, is performed by a scanning LIDAR system or a scanning LIDAR module. In other embodiments, method 2200 is performed by a series of circuits or an electronic system. Method 2200 is not limited by the particular type of apparatus performing the method. The various actions in method 2200 may be performed in the order presented, or may be performed in a different order. Further, in some embodiments, some actions listed in FIG. 22 are omitted from method 2200.

Method 2200 is shown beginning with block 2210 where a pulsed fanned beam of laser light is produced. In some embodiments, a pulsed laser beam is produced by a single laser diode, and in other embodiments, the pulsed laser beam is performed by a plurality of laser diodes. The pulsed laser beam is collimated and focused into a fanned beam as described above. The fanned beam may have any width (in degrees of field of view) without departing from the scope of the present invention.

At 2220, a transmit scanning mirror and a receive scanning mirror are synchronously scanned in two dimensions. This corresponds to scanning mirror assemblies within transmit module 110 and receive module 130 synchronously scanning. At 2230, the pulsed fanned beam is scanned in two dimensions into a field of view with the transmit scanning mirror. This is illustrated in FIG. 1 where the transmit module is shown scanning the pulsed fanned beam 112 into the field of view 128, and the fan has the shape shown at 124. At 2240, reflected light energy from the field of view is directed to an array of light sensitive devices with the receive scanning mirror. The synchronous scanning of the transmit and receive scanning mirrors results in light collected in a receive aperture shown at 126 (FIG. 1) being directed to the arrayed receiver.

At 2250, times-of-flight of the detected light reflections are measured to create a point cloud. This corresponds to the operation of the various TOF measurement circuits described above.

At 2260, an anomaly is detected in the measured times-of-flight. This may correspond to an anomaly anywhere in the field of view. For example, an anomaly may be detected in a region of the field of view that normally exhibits slow or gentle variation, such as a region pointing at a road surface near the system. Anomalies include, but are not limited to, high frequency variations and one more measurements beyond a threshold value. At 2270, a phase of the synchronous scanning is modified in response to the detected anomaly. For example, in some embodiments, a phase offset is injected into a slow-scan trajectory as shown in FIGS. 15 and 16.

Although the present invention has been described in conjunction with certain embodiments, it is to be understood that modifications and variations may be resorted to without departing from the scope of the invention as those skilled in the art readily understand. Such modifications and variations are considered to be within the scope of the invention and the appended claims.

What is claimed is:

1. A light detection and ranging system comprising:
   a laser light source;
   at least one light sensitive device;
   at least one time-of-flight measurement circuit responsive to the at least one light sensitive device;
   a first scanning mirror assembly responsive to a first drive signal to scan light from the laser light source into a scan trajectory in a field of view, the scan trajectory having a fast-scan direction and a slow-scan direction;
   a second scanning mirror assembly responsive to a second drive signal to synchronously scan with the first scanning mirror assembly and deposit reflected light energy from the field of view on the at least one light sensitive device; and
   a control circuit coupled to provide the first and second drive signals, wherein the control circuit includes a phase offset circuit, the phase offset circuit configured to selectively apply phase offsets to the scan trajectory in the slow-scan direction.

2. The light detection and ranging system of claim 1 further comprising an interference detection circuit configured to detect interference.

3. The light detection and ranging system of claim 2 wherein the phase offset circuit is coupled to selectively apply phase offsets to the scan trajectory in the slow-scan direction responsive to the interference detection circuit detecting interference.

4. The light detection and ranging system of claim 3 wherein the phase offset circuit selectively applies phase offsets to the scan trajectory by selecting a phase offset to apply to the scan trajectory using a backoff algorithm.

5. The light detection and ranging system of claim 3 wherein the phase offset circuit selectively applies phase offsets to the scan trajectory by selecting a phase offset to apply to the scan trajectory to select one of a discrete number of channels.

6. The light detection and ranging system of claim 3 wherein the interference detection circuit detects interference by detecting time-of-flight anomalies in the field of view.

7. The light detection and ranging system of claim 1 further comprising at least one optical device to form the light into a fanned beam.

8. The light detection and ranging system of claim 7 wherein the at least one light sensitive device comprises an array of light sensitive devices.

9. The light detection and ranging system of claim 8 wherein the at least one time-of-flight measurement circuit comprises a plurality of time-of-flight measurement circuits coupled to be responsive to the array of light sensitive devices.

10. A light detection and ranging system comprising:
    a laser light source;
    a scanning mirror assembly to scan laser light pulses from the laser light source into a scan trajectory in a scan field, the scan trajectory having two directions;
    a light sensitive device to detect reflections of the laser light pulses;
    a time-of-flight measurement circuit responsive to the light sensitive device;
    an interference detection circuit responsive to time-of-flight measurements made by the time-of-flight measurement circuit; and
    a phase offset circuit responsive to the interference detection circuit to selectively apply phase offsets to the scan trajectory.

11. The light detection and ranging system of claim 10 wherein the interference detection circuit comprises circuitry to detect high frequency variations in measured time-of-flight data, and wherein the phase offset circuit selectively applies phase offsets to the scan trajectory responsive to detected high frequency variations in the measured time-of-flight data.

12. The light detection and ranging system of claim 10 wherein the interference detection circuit comprises circuitry to detect anomalous time-of-flight data, and wherein the phase offset circuit selectively applies phase offsets to the scan trajectory responsive to detected anomalous time-of-flight data.

13. The light detection and ranging system of claim 10 wherein the phase offset circuit is configured to selectively apply phase offsets to the scan trajectory by selecting a phase offset to apply to the scan trajectory using an exponential backoff algorithm.

14. The light detection and ranging system of claim 10 wherein the phase offset circuit is configured to selectively apply phase offsets to the scan trajectory by selecting a phase offset to apply to the scan trajectory that corresponds to one of a plurality of phase-separated channels.

15. The light detection and ranging system of claim 10 wherein the phase offsets are selectively applied in one of the two directions.

16. A method comprising:
producing a pulsed fanned beam of laser light;
synchronously scanning a transmit scanning mirror and a receive scanning mirror to scan the pulsed fanned beam of laser light into a scan trajectory, the scan trajectory having two dimensions in a field of view and to deposit reflected light energy from the field of view onto an array of light sensitive devices;
measuring times-of-flight of pulses received by the array of light sensitive devices to create a point cloud;
detecting at least one anomaly in measured times-of-flight; and
modifying a phase of the scanning of the transmit scanning mirror to selectively apply phase offsets to the scan trajectory responsive to detecting the at least one anomaly in the measured times-of-flight.

17. The method of claim 16 wherein the detecting at least one anomaly comprises detecting high frequency variations of measured times-of-flight in a portion of the field of view and wherein the modifying a phase of the scanning of the transmit scanning mirror to selectively apply phase offsets to the scan trajectory is responsive to detecting the high frequency variations of measured times-of-flight.

18. The method of claim 16 wherein the detecting at least one anomaly comprises detecting measured times-of-flight greater than a threshold in a portion of the field of view and wherein the modifying a phase of the scanning of the transmit scanning mirror to selectively apply phase offsets to the scan trajectory is responsive to detecting the measured times-of-flight greater than the threshold.

19. The method of claim 16 wherein the modifying a phase of the scanning of the transmit scanning mirror to selectively apply phase offsets to the scan trajectory responsive to detecting the at least one anomaly comprises selecting a phase offset to apply to the scan trajectory using an exponential backoff algorithm.

20. The method of claim 16 wherein the modifying a phase of the scanning of the transmit scanning mirror to selectively apply phase offsets to the scan trajectory responsive to detecting the at least one anomaly comprises identifying an alternate phase-separated channel and selecting a phase offset to apply to the scan trajectory that corresponds to the identified alternate phase-separated channel.

\* \* \* \* \*